United States Patent
Herb

(10) Patent No.: US 9,965,428 B2
(45) Date of Patent: May 8, 2018

(54) LOGIC UTILIZATION WITH AXI4 AUGMENTED ADDRESS

(71) Applicant: Raytheon Company, Waltham, MA (US)

(72) Inventor: Philip P. Herb, Fort Wayne, IN (US)

(73) Assignee: RAYTHEON COMPANY, Waltham, MA (US)

( * ) Notice: Subject to any disclaimer, the term of this patent is extended or adjusted under 35 U.S.C. 154(b) by 314 days.

(21) Appl. No.: 14/802,120

(22) Filed: Jul. 17, 2015

(65) Prior Publication Data

US 2017/0017603 A1    Jan. 19, 2017

(51) Int. Cl.
*G06F 13/00* (2006.01)
*G06F 13/40* (2006.01)
*G06F 13/362* (2006.01)

(52) U.S. Cl.
CPC ........ *G06F 13/4068* (2013.01); *G06F 13/362* (2013.01)

(58) Field of Classification Search
CPC ........................... G06F 13/362; G06F 13/4068
See application file for complete search history.

(56) References Cited

U.S. PATENT DOCUMENTS

| | | |
|---|---|---|
| 7,877,524 B1 | 1/2011 | Annem |
| 8,838,869 B1 | 9/2014 | Puranik |
| 8,875,073 B1 | 10/2014 | Sundararajan |
| 2015/0012679 A1* | 1/2015 | Davis .................. G06F 13/4022 710/110 |

FOREIGN PATENT DOCUMENTS

CN        103345461        10/2013

* cited by examiner

*Primary Examiner* — Zachary K Huson
(74) *Attorney, Agent, or Firm* — Cantor Colburn LLP

(57) ABSTRACT

An advanced extensible interface 4 (AXI4) topology is provided. The topology includes a main entity, parallel sub entities comprising a first sub entity having a first functionality and a second sub entity comprising parallel third sub entities having a second functionality, which is different from the first functionality, and a controllable element in series with the parallel third sub entities and an AXI4 interconnect element serially interposed between the main entity and the parallel sub entities. For a transaction issued by the main entity with an augmented address including first and second addresses, the first address is readable by the AXI4 interconnect element to select one of the first and second sub entities for transaction execution and the second address is readable by the controllable element to select one of the third sub entities for transaction execution.

15 Claims, 5 Drawing Sheets

LOGIC UTILIZATION WITH AXI4 AUGMENTED ADDRESS

BACKGROUND

The present invention relates to AXI4 augmented addressing and, more specifically, to improved logic utilization with AXI4 augmented addressing.

Advanced microcontroller bus architecture (AMBA) is an open-standard, on-chip interconnect specification for the connection and management of functional blocks in system-on-a-chip (SoC) designs. AMBA facilitates development of multi-processor designs with large numbers of controllers and peripherals. Since its inception, the scope of AMBA has, despite its name, gone far beyond micro-controller devices and is now used on a range of application specific integrated circuit (ASIC) and SoC parts including applications processors used in modern portable mobile devices like smartphones.

In greater detail, the first AMBA buses were advanced system buses (ASB) and advanced peripheral buses (APB). In later versions, high-performance buses (AHB), advanced extensible interfaces (AXI) and advanced trace buses (ATB) were added. Most recently, AXI4 has been developed to extend system-wide coherency.

The AXI4 protocol is a commercial standard that allows for the interconnection of design entities and endpoints by way of an interconnect entity. Within the AXI4 protocol, it has been seen that instantiation of multiple endpoints of a same type requires multiple connections to the interconnect entity. These multiple connections, for repeated instantiations of the same entity, results in increased field programmable gate array (FPGA) fabric use, increased data propagation delay and reduced design efficiency.

SUMMARY

According to one embodiment of the invention, an advanced extensible interface 4 (AXI4) topology is provided. The topology includes a main entity, parallel sub entities comprising a first sub entity having a first functionality and a second sub entity comprising parallel third sub entities having a second functionality, which is different from the first functionality, and a controllable element in series with the parallel third sub entities and an AXI4 interconnect element serially interposed between the main entity and the parallel sub entities. For a transaction issued by the main entity with an augmented address including first and second addresses, the first address is readable by the AXI4 interconnect element to select one of the first and second sub entities for transaction execution and the second address is readable by the controllable element to select one of the third sub entities for transaction execution.

According to another embodiment of the invention, an advanced extensible interface 4 (AXI4) topology is provided. The topology includes a main entity, a first sub entity having a first functionality, a second sub entity in parallel with the first sub entity and including a grouping of sub entities having like functionalities different from the first functionality and a controllable element in series with the grouped sub entities, and an AXI4 interconnect element. The AXI4 interconnect element is serially interposed between the main entity and the first and second sub entities. For a transaction issued by the main entity with an augmented address including first and second addresses, the first address is readable by the AXI4 interconnect element to select one of the first and second sub entities for transaction execution and the second address is readable by the controllable element to select one of the grouped sub entities for transaction execution.

According to yet another embodiment of the invention, a method of operating an advanced extensible interface 4 (AXI4) topology is provided. The method includes grouping of sub entities having like functionalities different from a first functionality of a first sub entity into a second sub entity with a controllable element disposed in series with the grouped sub entities and serially interposing an AXI4 interconnect element between a main entity and the first and second sub entities. For a transaction issued by the main entity with an augmented address including first and second addresses, the method further includes reading the first address by the AXI4 interconnect element to select one of the first and second sub entities for transaction execution and reading the second address the controllable element to select one of the grouped sub entities for transaction execution.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTIONS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

As will be described below, an approach is provided to overcome problems with instantiating multiple entities of a same type in, for example, AXI4 protocol compatible devices. The approach makes use of augmented addressing so that instantiating multiple design entities of a same type requires only one connection to the interconnect entity. The augmented addressing is based on employment of a range of address bits to uniquely identify each instantiation of a replicated entity. In an implementation of the approach, a controller wraps multiple instantiations to ensure that each entity has a unique address and is designed to automatically instantiate the correct number of entities. Doing so increases design efficiency in that one connection to the interconnect entity decreases FPGA fabric utilization, and reduced connections to the interconnect entity translate into a reduction in data propagation delay.

Figure 1:
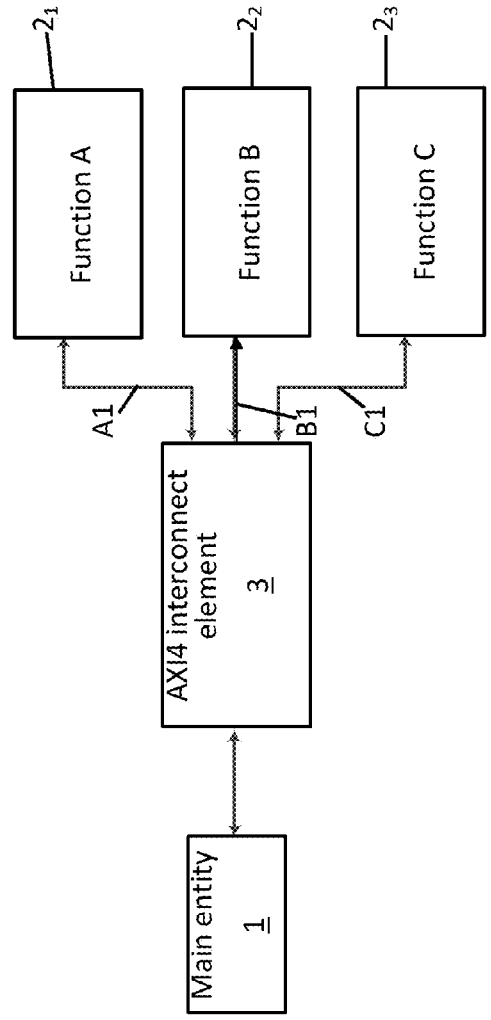
FIG. 1 is an illustration of a topology for sub entities with unique functionalities.

With reference to FIG. 1, AXI4 is a commercial standard that allows a main entity 1 to transfer data with respect to multiple sub entities $2_1$, $2_2$, $2_3$. As shown in FIG. 1, a typical topology for an AXI4 system is one in which the sub entities $2_1$, $2_2$, $2_3$ each have unique functionalities (e.g., sub entity $2_1$ has functionality A, sub entity $2_2$ has functionality B and sub entity $2_3$ has functionality C) and a unique connection with the AXI4 interconnect element 3 (e.g., sub entity $2_1$ has connection A1, sub entity $2_2$ has connection B1 and sub entity $2_3$ has connection C1). The AXI4 interconnect element 3 provides for mutually exclusive connections for each of the sub entities $2_1$, $2_2$, $2_3$ to the main entity 1, when the main entity 1 executes an access or transaction that implicates the unique functionality of any of the sub entities $2_1$, $2_2$, $2_3$. The access or transaction may include one or both of read and write operations.

For example, when the main entity 1 initiates an access to one of the sub entities $2_1$, $2_2$, $2_3$, the main entity 1 drives an address that is decoded by the AXI4 interconnect element 3 and the one of the sub entities $2_1$, $2_2$, $2_3$ to which the access is directed. The address driven by the main entity 1 is N-bits in length and has the format illustrated in FIG. 2.

Figure 2:
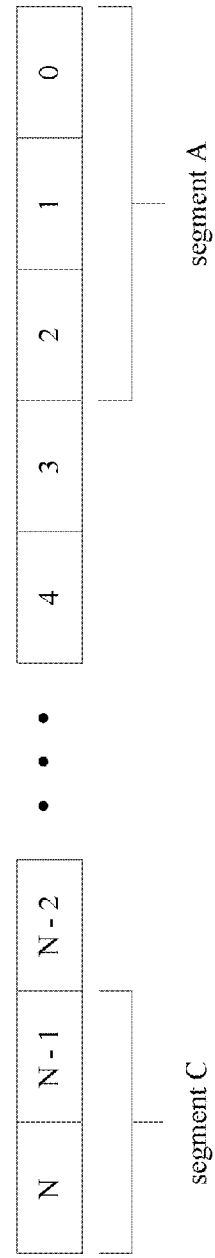
FIG. 2 illustrates a partitioning of an AXI4 address into two distinct, non-overlapping segments.

With reference to FIG. 2, which provides an illustration of the format of the address driven by the main entity 1, it is noted that FIG. 2 also illustrates a partitioning of the address into two distinct, non-overlapping segments. These include segment A and segment C. The respective lengths of these two distinct, non-overlapping segments are not necessarily the lengths depicted in FIG. 2. Segment C is decoded by the AXI4 interconnect element 3 and selects which one of the sub entities $2_1$, $2_2$, $2_3$ is the destination for the transaction sourced by the main entity 1. Only one of the sub entities $2_1$, $2_2$, $2_3$ will be selected as the destination. The address partition labeled segment A is decoded by the one of the sub entities $2_1$, $2_2$, $2_3$ to control specific functionality within the one of the sub entities $2_1$, $2_2$, $2_3$ that responds to the transaction of the main entity 1. As noted above, each one of the sub entities $2_1$, $2_2$, $2_3$ has unique functionality that it implements and this functionality is accessed with the segment A partition of the address.

Figure 3:
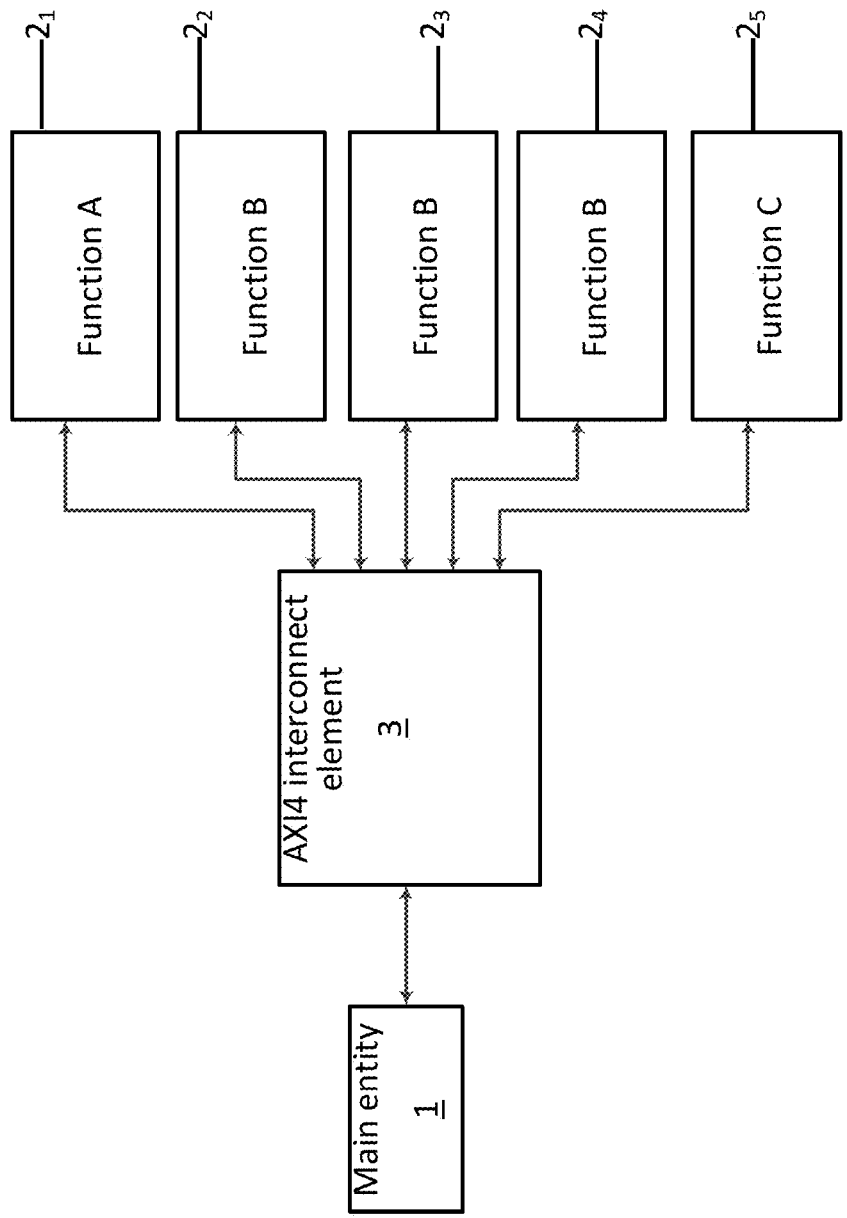
FIG. 3 is an illustration of a parallel topology for sub entities with unique functionalities.

If the topology illustrated in FIG. 1 were to be expanded to a case where there are five sub entities $2_1$, $2_2$, $2_3$, $2_4$, $2_5$ that are all communicative with the XI4 interconnect element 3, where two of the sub entities $2_1$, $2_5$ have unique functionalities and where three of the sub entities $2_2$, $2_3$, $2_4$ have a same functionality, the topology can be implemented in a parallel format as shown in FIG. 3. The address decoding for the parallel implementation follows from that of FIG. 2.

Figure 4:
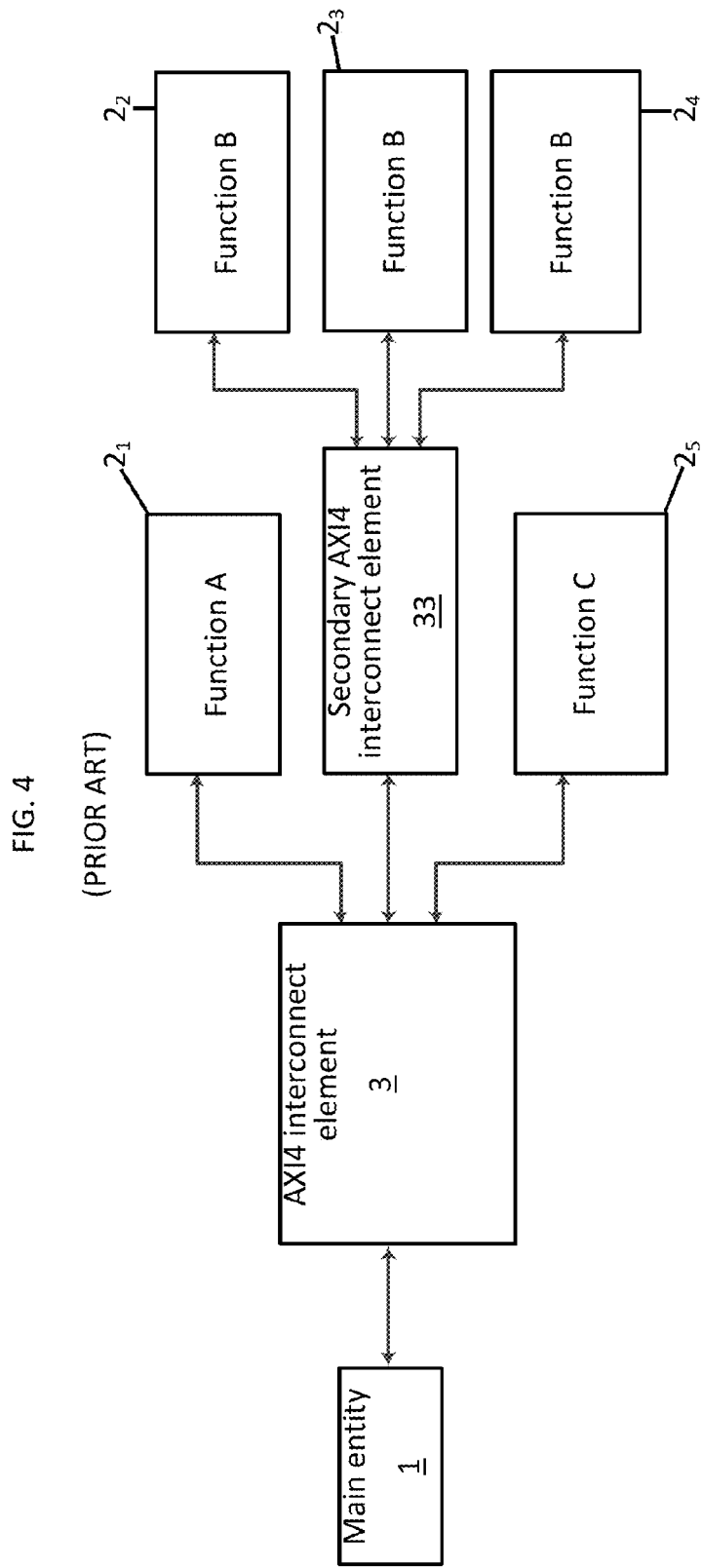
FIG. 4 is an illustration of a serial topology for sub entities with unique functionalities.

Alternatively, a second method for implementing sub entities with a same functionality is a serial topology as shown in FIG. 4. In this case, the AXI4 interconnect element 3 is communicative with sub entities $2_1$, $2_5$ and with secondary AXI4 interconnect element 33. The secondary AXI4 interconnect element 33 is, in turn, communicative with sub entities $2_2$, $2_3$, $2_4$. The address decoding follows from the previous two topologies with the secondary AXI4 interconnect element 33 also decoding the segment C address partition.

Figure 5:
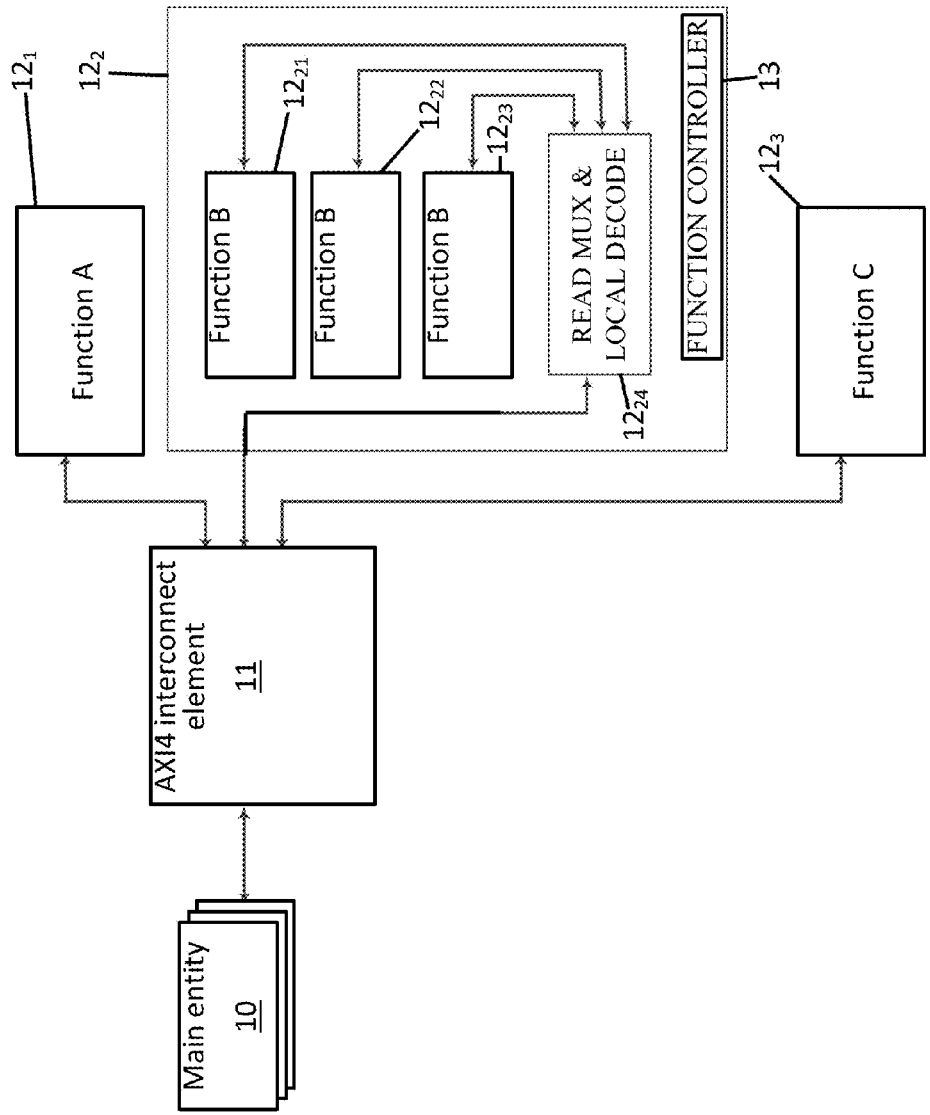
FIG. 5 is an illustration of a topology for sub entities with unique functionalities and for sub entities that are grouped according to similar functionalities in accordance with embodiments.

In contrast to the inefficient topologies described above and presented in FIGS. 3 and 4, the topology illustrated in FIG. 5 takes advantage of a grouping of sub entities with same functions into one single sub entity connection element. In detail, the main entity 10 is communicative with AXI4 interconnect element 11 and the AXI4 interconnect element 11 is, in turn, communicative with sub entities $12_1$, $12_2$, $12_3$. Here, each of the sub entities $12_1$, $12_2$, $12_3$ has a unique functionality (e.g., sub entity $12_1$ has functionality A, sub entity $12_2$ has functionality B and sub entity $12_3$ has functionality C) and the sub entity $12_2$ acts as the one single sub entity connection element.

In accordance with embodiments, the sub entity $12_2$ includes sub entities $12_{21}$, $12_{22}$, $12_{23}$, a controllable element or read multiplexer and local decoder element $12_{24}$ and a controller 13. The sub entities $12_{21}$, $12_{22}$, $12_{23}$ have like or at least similar functionalities (e.g., sub entity $12_{21}$ has functionality B (or B1), sub entity $12_{22}$ has functionality B (or B2) and sub entity $12_{23}$ has functionality B (or B3)) and are disposed in parallel with one another. The read multiplexer and local decoder element $12_{24}$ is arranged in series with the sub entities $12_{21}$, $12_{22}$, $12_{23}$. The controller 13 controls operations of the read multiplexer and local decoder element $12_{24}$.

Although FIG. 5 illustrates a topology in which the sub entities $12_{21}$, $12_{22}$, $12_{23}$ are arranged in parallel and the read multiplexer and local decoder element $12_{24}$ is arranged in series with the sub entities $12_{21}$, $12_{22}$, $12_{23}$, it is to be understood that this is not required and that other arrangements are possible. These may include, but are not limited to, increasingly complex parallel arrangements and/or a serial arrangement similar to the topology shown in FIG. 4. That is, sub entity $12_{22}$ could, for example, be replaced by a feature similar to the secondary AXI4 interconnect element 33 of FIG. 4 that would, in turn, be communicative with additional sub entities. In accordance with additional or alternative embodiments, the main entity 10 may be provided as a single main entity or as one of multiple main entities that are each directly or indirectly communicative with the AXI interconnect element 11. With this in mind, it is noted that only the topology of FIG. 5 is presented and described herein for purposes of clarity and brevity.

As a result of the sub entities $12_{21}$, $12_{22}$, $12_{23}$ being arranged in parallel and the read multiplexer and local decoder element $12_{24}$ being arranged in series with the sub entities $12_{21}$, $12_{22}$, $12_{23}$ and all the components being grouped together in sub entity $12_2$, FPGA or ASIC resources required to implement the topology of FIG. 5 are reduced and an overall response of the topology of FIG. 5 can be improved. Achieving this resource reduction and response improvement associated with the sub entity grouping, however, requires augmented addressing. In particular, with reference to FIG. 6, the address driven by the main entity 10 during an access is parsed into three segments. These three segments include, but are not limited to, segment A, segment B and segment C. The respective lengths of these three distinct, non-overlapping segments are not necessarily the lengths depicted in FIG. 6.

Like the previous examples, segment C is decoded by the AXI4 interconnect element 11 and selects which of the sub entities $12_1$, $12_2$, $12_3$ is the destination for the transaction sourced by the main entity 10. Only one of the sub entities $12_1$, $12_2$, $12_3$ will be selected as the destination for the transaction of the main entity 10 (sub entity $12_2$ in this case). The address partition labeled segment B is first decoded by the read multiplexer and local decoder element $12_{24}$ under the control of the controller 13 within the like function grouping of sub entity $12_2$ to direct the transaction of the main entity 10 to one and only one of the grouped like functions (i.e., one and only one of the sub entities $12_{21}$, $12_{22}$, $12_{23}$). The address partition labeled segment A is then decoded by the one of the sub entities $12_{21}$, $12_{22}$, $12_{23}$ to which the transaction of the main entity 10 is directed in order to access specific functionality.

Figure 6:
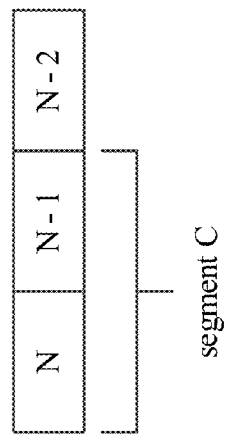
FIG. 6 illustrates a partitioning of an AXI4 address into three distinct, non-overlapping segments for augmented addressing.

As an example, and with reference to FIG. 6, main entity 10 forms an address with the 3 segments, segment C, segment B and segment A. The AXI4 address segment C has an (M:N) format where M and N are 0, 1, 2, . . . , n and permits the AXI4 interconnect element 11 to select up to 1 of $2^n$ functions. Thus, for the topology of FIG. 5, the AXI4 address segment C could select functionality B such that the AXI4 interconnect element 11 directs the transaction to the sub entity $12_2$. The AXI4 address segment B has an (I:J) format where I and J are 0, 1, 2, . . . , n and permits the $12_2$ function to select up to 1 of $2^n$ sub entities. For the topology of FIG. 5, the local decoder element $12_{24}$ selects one of the sub entities $12_{21}$, $12_{22}$, and $12_{23}$ by decoding AXI4 address segment B. The selected sub entity further decodes AXI4 address segment A to respond to the transaction initiated by the main entity 10. For a read transaction, the local decoder element $12_{24}$ decodes the AXI4 address segment B to determine which one of the sub entities $12_{21}$, $12_{22}$, $12_{23}$ of like functionalities returns its data to the main entity 10.

Figure 7:
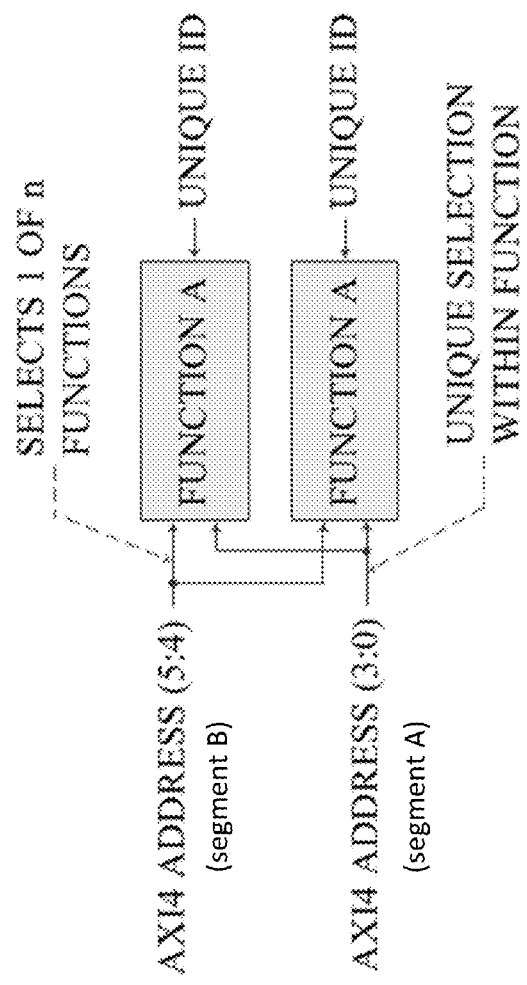
FIG. 7 is a schematic diagram illustrating augmented addressing in operation.

Applied to FIG. 7, if AXI4 address segment B has the format (5:4), the local decoder decodes the AXI4 address segment B to direct the main entity 10 access to up to one of four sub entities. The selected sub entity in the embodiment of FIG. 7 decodes AXI4 address segment A to complete the transaction. If the transaction is a read access, the local decoder element $12_{24}$ also decodes AXI4 address segment B to select which of the possible entities returns its value to the main entity 10. The specific value a sub entity returns to the main entity 10 is decoded from AXI4 address segment A, which has the format (3:0). The function controller 13 in FIG. 5 assigns a unique ID to each function A in FIG. 7. The local decoder element $12_{24}$ in FIG. 5 compares the AXI4 address segment B (assigned (5:4) in FIG. 7) against the unique ID. If the two values are equal, a sub entity ($12_{21}$, $12_{22}$, or $12_{23}$ in FIG. 5) is selected.

As used herein, the term functionality or function can refer to any function or operation of a peripheral or connected device in a computing system. For example, the various functionalities referred to above may include but are not limited to, data converters, interrupt controllers, timers, serial interfaces, waveform generators, processors and receivers.

Augmented addressing allows a topology, such as the topology of FIG. 5, with like functional entities or sub entities to group the like functional entities/sub entities into a configuration that is viewed as one single sub entity by the main entity and the AXI4 interconnect element. Augmented addressing parses a segment of the main entity address to select individual entities/sub entities within the grouping. The use of augmented addressing to group like functional elements (entities/sub entities) reduces resources within the FPGA or ASIC and also relieves potential latency issues. The augmented address approach has been successfully deployed on FPGA design and reduces the FPGA fabric requirements associated with the AXI4 interconnect element implementation and also improves the data propagation through the AXI4 interconnect element.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts and equivalents of all means or step plus function elements in the claims below are intended to include any structure, material or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flow diagrams depicted herein are exemplary. There may be many variations available without departing from the spirit of the invention.

While embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. An advanced extensible interface 4 (AXI4) topology, comprising:
   a main entity;
   parallel sub entities comprising a first sub entity having a first functionality and a second sub entity comprising parallel third sub entities having a second functionality, which is different from the first functionality, and a controllable element in series with the parallel third sub entities; and
   an AXI4 interconnect element serially interposed between the main entity and the parallel sub entities wherein, for a transaction issued by the main entity with an augmented address including first and second addresses:
   the first address is readable by the AXI4 interconnect element to select one of the first and second sub entities for transaction execution, and
   the second address is readable by the controllable element to select one of the third sub entities for transaction execution.

2. The topology according to claim 1, wherein the main entity comprises a single main entity or multiple main entities.

3. The topology according to claim 1, wherein the first and second functionalities respectively comprise different ones of data conversion, interrupt control, timing, serial interfacing, waveform generation, processing and receiving.

4. The topology according to claim 1, wherein the controllable element comprises a read multiplexer and local decoder.

5. The topology according to claim 1, wherein the first and second addresses comprise (M:N) and (I:J) formats, respectively.

6. The topology according to claim 1, wherein the second functionality of each of the parallel third sub entities is uniform for all of the parallel third sub entities.

7. The topology according to claim 1, wherein the second functionality of each of the parallel third sub entities is similar for all of the parallel third sub entities.

8. An advanced extensible interface 4 (AXI4) topology, comprising:
- a main entity;
- a first sub entity having a first functionality;
- a second sub entity in parallel with the first sub entity and comprising:
  - a grouping of sub entities having like functionalities different from the first functionality; and
  - a controllable element in series with the grouped sub entities; and
- an AXI4 interconnect element serially interposed between the main entity and the first and second sub entities wherein, for a transaction issued by the main entity with an augmented address including first and second addresses:
- the first address is readable by the AXI4 interconnect element to select one of the first and second sub entities for transaction execution, and
- the second address is readable by the controllable element to select one of the grouped sub entities for transaction execution.

9. The topology according to claim 8, wherein the main entity comprises a single main entity or multiple main entities.

10. The topology according to claim 8, wherein the first and like functionalities respectively comprise different ones of data conversion, interrupt control, timing, serial interfacing, waveform generation, processing and receiving.

11. The topology according to claim 8, wherein the controllable element comprises a read multiplexer and local decoder.

12. The topology according to claim 8, wherein the first and second addresses comprise (M:N) and (I:J) formats, respectively.

13. The topology according to claim 8, wherein the like functionalities are all the same.

14. The topology according to claim 8, wherein the like functionalities are all similar.

15. A method of operating an advanced extensible interface 4 (AXI4) topology, the method comprising:
- grouping sub entities having like functionalities different from a first functionality of a first sub entity into a second sub entity with a controllable element disposed in series with the grouped sub entities; and
- serially interposing an AXI4 interconnect element between a main entity and the first and second sub entities wherein, for a transaction issued by the main entity with an augmented address including first and second addresses, the method further comprises:
- reading the first address by the AXI4 interconnect element to select one of the first and second sub entities for transaction execution, and
- reading the second address the controllable element to select one of the grouped sub entities for transaction execution.

* * * * *